United States Patent
Bruske et al.

(10) Patent No.: US 11,414,792 B2
(45) Date of Patent: Aug. 16, 2022

(54) ALL-STEEL FITTING

(71) Applicant: Groz-Beckert KG, Albstadt (DE)

(72) Inventors: Johannes Bruske, Albstadt (DE); Peter Meinert, Balingen (DE); Carmen Goltermann, Tübingen (DE); Bernd Binder, Albstadt (DE)

(73) Assignee: Groz-Beckert KG, Albstadt (DE)

( * ) Notice: Subject to any disclaimer, the term of this patent is extended or adjusted under 35 U.S.C. 154(b) by 335 days.

(21) Appl. No.: 15/309,745

(22) PCT Filed: May 5, 2015

(86) PCT No.: PCT/EP2015/059839
§ 371 (c)(1),
(2) Date: Nov. 8, 2016

(87) PCT Pub. No.: WO2015/169797
PCT Pub. Date: Nov. 12, 2015

(65) Prior Publication Data
US 2017/0145600 A1    May 25, 2017

(30) Foreign Application Priority Data
May 9, 2014 (EP) .................... 14167767

(51) Int. Cl.
*C21D 9/26* (2006.01)
*D01G 15/88* (2006.01)
(Continued)

(52) U.S. Cl.
CPC .............. *D01G 15/88* (2013.01); *C21D 1/10* (2013.01); *C21D 1/42* (2013.01); *C21D 9/26* (2013.01); *C21D 9/24* (2013.01); *Y02P 10/25* (2015.11)

(58) Field of Classification Search
CPC . D01G 15/88; C21D 1/10; C21D 1/42; C21D 9/26; C21D 9/24
See application file for complete search history.

(56) References Cited

U.S. PATENT DOCUMENTS 2,326,674 A * 8/1943 Pavitt ................ C21D 1/10
148/621
4,109,127 A * 8/1978 Frungel .............. C21D 1/10
219/661
(Continued)

FOREIGN PATENT DOCUMENTS

| CH | 670455 A5 | 6/1989 |
|---|---|---|
| CN | 1594606 A | 3/2005 |

(Continued)

OTHER PUBLICATIONS

International Search report in corresponding International Application No. PCT/EP2015/059839, dated Jul. 2, 2015, 7 pages.
(Continued)

*Primary Examiner* — Shaun R Hurley
(74) *Attorney, Agent, or Firm* — Fitch, Even, Tabin and Flannery LLP

(57) ABSTRACT

In the method according to the invention, a wire (11) provided with teeth (15) passes sequentially through a first inductor (16) and a second inductor (18). The inductors (16, 18) function at different frequencies and generate different temperatures. The first inductor (16) heats in particular the base section (17), which is not to be hardened, to a high temperature below the austenitizing temperature range. The second inductor (18) heats the teeth (15) to a still higher second temperature within the austenitizing temperature range. Defined, hardened teeth of consistently high quality result at quenching.

16 Claims, 1 Drawing Sheet

(51) Int. Cl.
*C21D 1/10* (2006.01)
*C21D 1/42* (2006.01)
*C21D 9/24* (2006.01)

(56) References Cited

U.S. PATENT DOCUMENTS

| | | | |
|---|---|---|---|
| 4,696,080 | A | 9/1987 | Nakamura |
| 5,096,506 | A | 3/1992 | Hollingsworth |
| 6,416,707 | B1 | 7/2002 | Graf |
| 6,544,402 | B2 | 4/2003 | Graf |
| 7,735,201 | B1* | 6/2010 | Reeves .............. D01G 15/88 19/114 |
| 7,743,470 | B2 | 6/2010 | Graf |
| 7,797,798 | B2 | 9/2010 | Rosemann |
| 8,745,826 | B2 | 6/2014 | Vangheluwe et al. |
| 2002/0124546 | A1 | 9/2002 | Schuller et al. |
| 2005/0247704 | A1* | 11/2005 | Loveless .............. C21D 1/42 219/661 |
| 2007/0028423 | A1 | 2/2007 | Graf |
| 2013/0042437 | A1* | 2/2013 | Vangheluwe ........ D01G 15/88 19/114 |
| 2013/0133159 | A1* | 5/2013 | Vangheluwe ........ D01G 15/88 19/114 |
| 2014/0259537 | A1* | 9/2014 | Zhang .................. D01G 15/88 19/114 |
| 2014/0338154 | A1* | 11/2014 | Zhang .................. D01G 15/88 19/99 |
| 2017/0002483 | A1* | 1/2017 | Bocht .................. D01G 15/88 |
| 2017/0096751 | A1* | 4/2017 | Zhang .................. D01G 15/88 |
| 2017/0145600 | A1* | 5/2017 | Bruske ................. C21D 9/26 |
| 2017/0253953 | A1* | 9/2017 | Meyer .................. C22F 1/04 |
| 2018/0135208 | A1* | 5/2018 | Grob ................... D01G 15/88 |
| 2018/0142381 | A1* | 5/2018 | Iten .................... D01G 15/14 |

FOREIGN PATENT DOCUMENTS

| | | |
|---|---|---|
| CN | 1873033 A | 12/2006 |
| CN | 101096786 A | 1/2008 |
| CN | 103173603 A | 6/2013 |
| DE | P40020 | 4/1952 |
| DE | 2332685 A1 | 1/1975 |
| DE | 2904841 A1 | 8/1980 |
| DE | 19940845 C1 | 12/2000 |
| DE | 10007567 A1 | 8/2001 |
| DE | 10106673 A1 | 8/2002 |
| DE | 102005025627 B3 | 10/2006 |
| EP | 1728878 A2 | 12/2006 |
| EP | 2942425 B1 | 11/2019 |
| JP | S5641320 A | 4/1981 |
| JP | S61160426 A | 7/1986 |
| JP | H04241120 A | 8/1992 |
| JP | H07118935 A | 5/1995 |
| JP | 2909774 B2 | 6/1999 |
| JP | 2004244748 A | 9/2004 |
| JP | 2006336108 A | 12/2006 |
| JP | 2017519104 A | 7/2017 |
| KR | 2013-0064065 A | 6/2013 |
| WO | 9115605 A1 | 10/1991 |
| WO | 2013072136 A1 | 5/2013 |

OTHER PUBLICATIONS

Office action in corresponding Chinese Application No. 201580024128. 4, dated Nov. 23, 2017, 18 pages.
European Examination Report in corresponding European Application No. 14 167 767.4 dated May 15, 2018, with Machine English Translation (8 pages).
Indian Office Action dated Nov. 12, 2020, in corresponding Indian Application No. 201617030519 (5 pages).
Chinese Reexamination Report dated Sep. 28, 2020, in corresponding Chinese Application No. 201580024128.4, with machine English translation (12 pages).
Li Yuxuan et al., Electrical Machining Technology, China Industry Press, Nov. 1963, pp. 124-127, accessed Sep. 14, 2020, with machine English translation (9 pages).
Japanese Office Action dated Mar. 12, 2019, in corresponding Japanese Patent Application No. 2016-567226 with English Translation (7 pgs.).
Japanese Notice of Reasons for Refusal dated Sep. 27, 2021, in corresponding Japanese Application No. 2020-188156, with English translation (7 pages).
Korean Office Action dated Dec. 29, 2021, in corresponding Korean Application No. 10-2016-7031055, with English translation (11 pages).
Chinese Office Action dated Feb. 16, 2022, in corresponding Chinese Application No. 202011267008.6, with machine English translation (15 pages).
European Notice of Opposition dated Aug. 21, 2020, in corresponding European Application No. 14167767.4, with machine English translation (162 pages).
Delivery Note, Trutzschler Card Clothing GmbH, Shipment No. 000579, dated Aug. 28, 2013 (10 pages).
Invoice,Trützschler Card Clothing GmbH, Invoice No. 0001065 / 207035, Shipment No. 000579, dated Aug. 28, 2013 (8 pages).
Bill of Lading,Trützschler Card Clothing GmbH, Order No. TR102446, dated Feb. 12, 2012 (1 page).
Invoice, Trützschler Card Clothing GmbH, Invoice No. 12150685/ 102204, Order No. TR102446, dated Feb. 9, 2012 (1 page).
ERP order excerpts,Trützschler Card Clothing GmbH, Shipment No. 102446, dated Jan. 30, 2012 (1 page).
Dipl.-Ing. Andrew Fiddler, "Einfluss des Werkstoffzustandes auf das Wärmebehandlungsergebnis beim induktiven Randschichthärten," PhD Dissertation, Technischen Universität Darmstadt, Submitted Oct. 22, 2012, with machine English translation (326 pages).
Dr.-Ing. Dieter Liedke, "Warmebehandlung von Stahl—Randschichthärten," Stahl-Informations-Zentrum, Aug. 2009, with machine English translation (94 pages).

\* cited by examiner

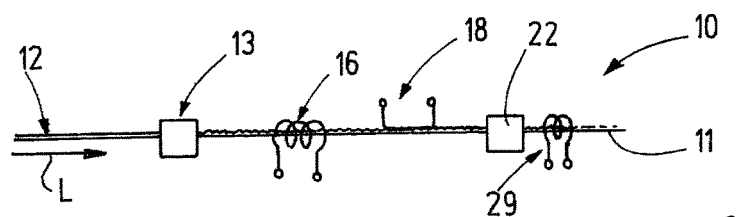
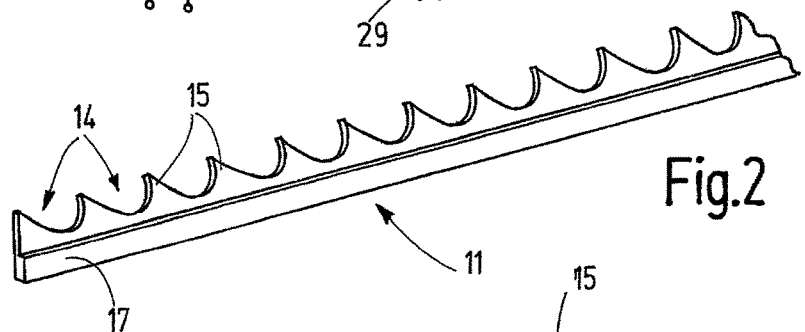
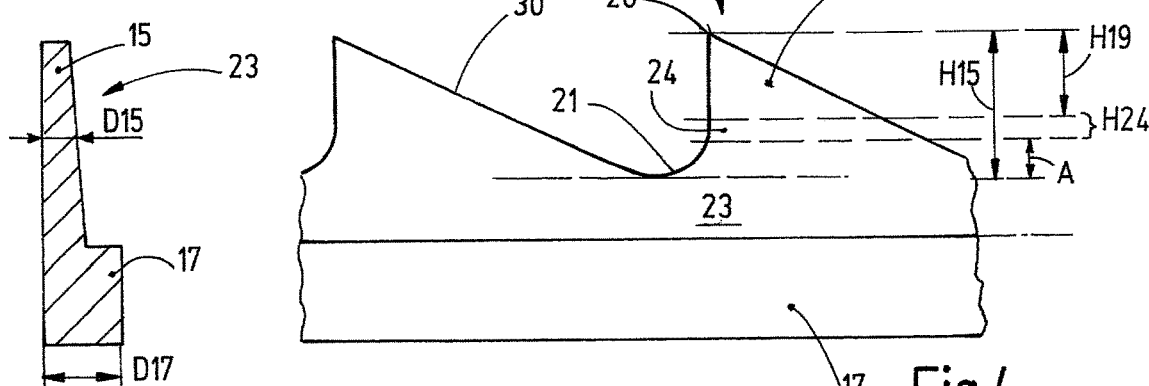
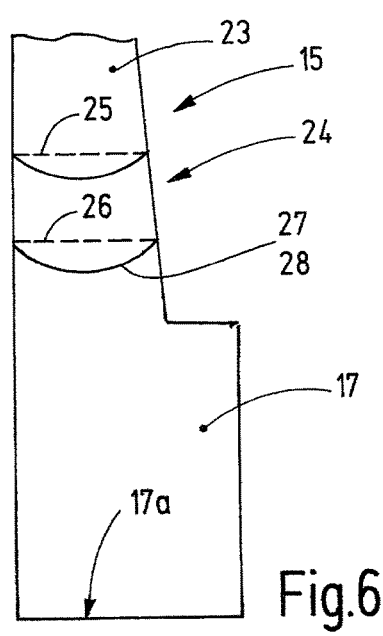
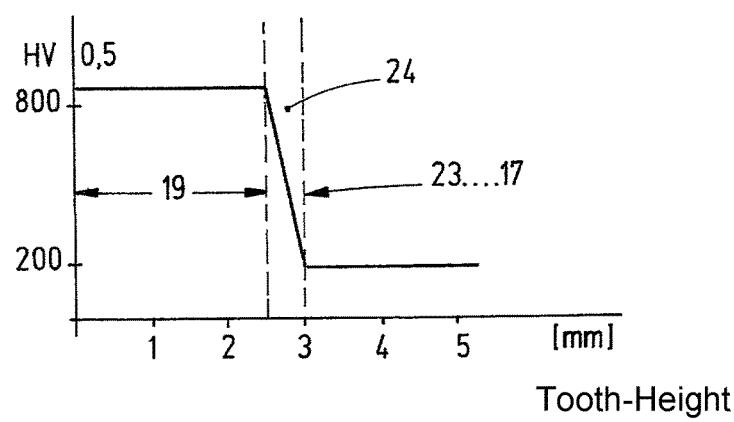
Fig.1
Fig.2
Fig.3
Fig.4
Fig.5
Fig.6

US 11,414,792 B2

ALL-STEEL FITTING

CROSS REFERENCE TO RELATED APPLICATIONS

This patent application is the national phase of PCT/EP2015/059839 filed May 5, 2015, which claims the benefit of European Patent Application No. 14167767.4 filed May 9, 2014.

TECHNICAL FIELD

The invention relates to a method for producing a clothing wire for an all-steel card clothing and to a clothing wire with induction-hardened teeth.

BACKGROUND

A clothing wire (sawtooth wire) as has been known from publication DE 2904841, for example, is used for the production of an all-steel card clothing. Such a clothing wire has a base section of greater thickness and a toothed wall section extending away from the base section. The teeth formed there are hardened, in particular, in the vicinity of the tooth tip. Overall, the clothing wire has four zones of differing hardness. In a first section extending from the tooth tip up to approximately half the tooth height, the clothing wire has a hardness of at least 60 HRC. In the adjoining zone, the hardness is fixed at a value of 60 HRC to 55 HRC. In the next-adjoining zone, a hardness of 50 HRC to 55 HRC is provided in such a manner that a hardness of approximately 40 HRC still exists in the region of the tooth base. The remaining zone that is taken up by the base part of the wire is not hardened.

For hardening, hardenable steel is first brought to a high temperature and then quenched.

To accomplish this, document CH 670455 A5 provides that the teeth of a clothing wire be briefly heated to a temperature within the austenitizing temperature range by means of a $CO_2$ gas laser using single pulses or pulse packets. Due to the minimal thermal capacity of a tooth it will thereafter cool again very rapidly in air, thus effecting a quenching hardening. A hardness of 950 HV can be achieved in the toothed. region, wherein the hardness at the tooth base is only 200 HV. The boundary between the hardened and unhardened material progresses in an arcuate or straight line.

Indeed, the high energy of the laser beam causes rapid heating; however, problems relating to the uniformity of the energy input and, consequently, local overheating can result.

Publication DE 101 06 673 A1 is based on the finding that it is difficult to always limit the heat treatment during the hardening operation within defined ranges. In conjunction with this, this publication suggests the inductive heating of the clothing wire and, in doing so, heat with the highest-possible frequency so that the hardening effect is essentially restricted to the teeth tips and the surface of the teeth of the clothing wire. To do so, a frequency of 1 to 2 MHz is used. Heating may take place with the use of protective gas. The hardening process takes place by quenching with water, air or oil. Subsequently, the clothing wire is treated at a very low annealing temperature of only 130°, for example, in order to eliminate undesirable tensions—without the clothing wire losing its hardness.

SUMMARY

It is the object of the invention to provide an improved concept for the production and embodiment of an all-steel card clothing. In conjunction with this, teeth with geometrically precise tooth tips are to be obtained, in particular—without subsequent processing.

With the use of the method according to the invention the wire intended for the production of the card clothing is first subjected to a heating process in a first station, wherein the wire is heated, as it is passing through, in its base section as well as in its wall section. This heating may be performed, e.g., by any method, wherein the thermal energy is transferred to the wire and, in doing so, in particular to its base section, or is generated in said wire. For example, the wire may be passed through a heating furnace in which the thermal energy is transferred to the wire by means of radiation and/or natural and/or assisted convection. It is also possible to heat the wire utilizing its Ohmic resistance by passing a current through said wire. To do so, the wire may be passed between two opposing electrodes—e.g., carbon electrodes—that are supplied with DC current or low-frequency AC current (e.g., 50 Hz) and that contact the wire on the lateral surfaces. As a result of this, the wire is electrically perfused, in particular and preferably predominantly, on its base section in transverse direction, and is thus heated. It is also possible to arranged two electrodes or also electrode pairs or several electrode groups in wire longitudinal direction at a distance from each other in such a manner that the current is input and output at spaced-apart locations in the wire. The longitudinal flow through the wire distributes the thermal effect of the current in the moving wire to a longer section and thus makes possible a uniform heating of —in particular—the base section. In both methods, it is mostly the base section that is perfused and heated. The heating station may comprise one or more heat sources.

Preferably, the wire and, in doing so, in particular its base section, is however inductively heated in the first heating station. In doing so, a first frequency is used for this work and the field of the inductor is oriented in such a manner that, in particular, the base section moves through the field. Preferably, the first frequency is selected in such a manner that the vortical currents forming in the wire predominantly perfuse the base section, but the teeth less so. Preferably, the inductor and the magnetic field generated by it are oriented in such a manner that the vortical current flow around the wire longitudinal axis, i.e., the axis of the magnetic field, coincides at least approximately with the longitudinal axis of the wire. Thus the teeth remain predominantly free of vortical currents. However, it is also possible to orient the axis of the magnetic field transversely with respect to the wire. The first heating station may comprise one or more inductors operating at the same frequency or at different frequencies.

In the first station, the wire is preheated—in its entirety or at least on its base section—to the first temperature. Thereafter, the wire moves in preheated state (at least on the base section) through a second station for induction heating, in which case the inductor of the second station operates at a second frequency that is higher than the first frequency. The field of the inductor is preferably oriented in such a manner that said field covers only the wall section, i.e., the teeth formed there. The second frequency is higher than the first frequency such that a uniform heating of the teeth up into the tooth tips is achieved. Furthermore, the second temperature is higher than the first temperature. In particular, it is within the austenitizing temperature range. The second station may comprise one or more inductors that operate at the same frequency or at different frequencies. It applies that the frequencies of the second inductors are higher than the frequencies of the first inductors.

After passing through the (at least one) second inductor, at least the wall section having the teeth, preferably however the entire wire, are quenched in a cooling medium while passing through. The cooling medium may be gas, an inert gas, air, an aerosol, oil, water, an emulsion or another inert, slow-reacting or fast-reacting medium. By preheating the wire in the first station to a first temperature and feeding this heated wire to the second inductor while largely avoiding an intermediate cooling, it is prevented that the teeth—after passing through the second inductor—develop a hardness maximum at a distance from the tooth tip due to the release of thermal energy on the base section. Rather, it is achieved that—starting from the tooth tip—a uniformly high hardness is achieved, said hardness extending up to a transition zone. Preferably, this transition zone may be strip-like straight-lined and have a strip width of at most 0.5 mm, for example. Depending on the tooth size, a width of the transition zone is attempted that is at most 20% of the tooth height, measured from the tooth base to the tooth tip. In doing so, the zone width is measured in the same direction as the tooth height—perpendicularly with respect to the wire longitudinal direction. This applies to measurements in front of the tooth breast, as well as to measurements behind the tooth back. The small-space temperature graduation during the hardening operation that can be achieved with the method according to the invention causes a restriction of the width of the hardness transition zone to an almost line-like strip. This results in a clearly improved operational behavior compared with flame-hardened clothing wires. Teeth deform elastically or break. Plastic deformations of the teeth, i.e., lateral bending of said teeth, that would considerably interfere with the carding process are avoided.

The recesses provided in the wall section to form the teeth can be produced during continuous operation in a punching process. To do so, the wire may be intermittently moved through a punching stating. Alternatively, the punching station may be moved along with the wire during the punching process and then moved back into its starting position after the punching tool has been opened. The latter allows a particularly uniform wire advance movement, in particular in the inductors and the quenching station. It is also possible to form a wire loop between the punching station and the inductors, said wire loop adapting shock-like wire movements in the punching station to the uniform wire movement in the inductors.

Preferably, the temperature $t1$ generated by the first inductor is below an austenitizing temperature range $tA$, whereas the temperature $t2$ generated by the second inductor is within the austenitizing temperature range $tA$. Preferably, the first temperature $t1$ is above 500° C. and below 900° C. (e.g., 700° C.-750° C.), whereas the second temperature $t2$ may be at approximately 950° C. The first temperature $t1$ is a soft annealing temperature and, in doing so, is preferably set high enough that the heat loss of the teeth after passing through the second inductor is minimal enough that the teeth—upon entering the quenching station—still have a temperature within the austenitizing temperature range. On the other hand, the dwell time in the two heating stations and up to the quenching operation is so low that the base section in the second heating station does not experience a substantial temperature increase relevant in view of hardening—either due to vortical currents or due to heat conduction out of the teeth. Rather, it is ensured that the base region, on entering the quenching station, exhibits a soft annealing temperature of at most 680° C., for example. In this manner, any incidental hardening is avoided and good process control is achieved. The first inductor (or the otherwise first heating station) and/or the second inductor may be operated under protective gas. Suitable protective gasses are, in particular, low-reactivity or inert gasses such as, e.g., nitrogen, argon or the like. In conjunction with this, the term "protective gas" also comprises high-reactivity gasses, in particular reducing gasses that may contribute to surface cleaning.

It is useful if the second frequency $f2$ is at least 5 times the first frequency $f1$. For example, the first frequency may be set to a maximum of 5 MHz, preferably a maximum of 3 MHz. In the preferred exemplary embodiment, it may be between 1 and 5 MHz. Preferably, the second frequency $f2$ is at least 10 MHz, further preferably at least 15 MHz. In a preferred exemplary embodiment, it is 20 MHZ to 30 MHZ, preferably 27 MHz. By using this setting, it is possible to achieve uniform quality and good process control.

After quenching, the wire may be passed through a third inductor that is operated at a third frequency $f3$, this being lower than the second frequency $f2$. The wire may be heated to a third temperature $t3$ that is at least lower than the second temperature $t2$ and is preferably also lower than the first temperature $t1$. Thus, an inductive annealing can be effected.

It is advantageous if induction heating takes place in both inductors under inert gas, for example nitrogen. A bright all-steel card clothing is formed without scaling, without partial tip melting of the teeth and with controlled hardness progression. In particular, it is possible to perform the shape-imparting processing in fully unhardened state. Mechanical shape-imparting subsequent machining such as grinding the tooth tips and/or chemical processing or the like is not necessary in hardened state.

Furthermore, it is advantageous if the wire is brushed on at least one lateral surface. In doing so, the punching burr produced in the punching station can be removed. Due to the hardness of the material, the punching burr may easily break off and can thus be brushed off.

A clothing wire that has been produced in accordance with the mentioned method has at least one and, preferably, only one brushed lateral surface. Due to the induction hardening under protective gas, the unbrushed lateral surface, the tooth breast surface and the tooth back of each tooth have the same chemical composition. Foreign atoms that originate from the brush can be found only on one lateral flank of the clothing wire.

In another aspect, the clothing wire includes a base section having a thickness that is greater than the thickness of the wall section and the thickness of the teeth. The teeth are hardened. The boundary between the hardened region of the teeth and the unhardened material preferably has the form of a straight strip having a width of at most 0.5 mm. The width amounts preferably to a maximum of 20% of the tooth height. Thus, the tooth preferably consists only of material that has been hardened completely or—in the small transition zone—hardened partially. Preferably, it does not comprise unhardened and thus ductile material. Preferably, the hardness outside this zone is uniformly high on the tooth and uniformly low on the base section. Local hardness maxima as well as, in particular, hardness increases away from the tooth tip to the tooth base are not recorded.

The strip-shaped transition zone in larger teeth is preferably, e.g., 3 mm, at a distance from the tooth tip. In any event, it is attempted that at least 70%, preferably at least 80%, of the tooth height are fully hardened. This applies to measurements in front of the tooth breast as well as to measurements behind the tooth back, because the transition zone is oriented preferably parallel to the wire longitudinal direction. Thus, a disadvantageous lateral bending of the teeth is precluded. Preferably, the transition zone ends slightly above the tooth gullet. However, it is also possible to define the transition zone in such a manner that it is in contact with the tooth gullet. In this manner, a maximally robust tooth breast is obtained, without too greatly restricting the bendability of the wire. Such a precise setting of the hardness boundary can be reliably achieved with the method according to the invention.

The wall sections and/or the teeth may be configured so as to have a trapezoidal or triangular cross-section and be tapered away from the base section. Even considering a considerable thickness reduction of the teeth from the tooth base to the tooth tip, the heating of the tooth may proceed—in particular in the second conductor—in such a controlled manner that any partial tooth tip melting, as has to be feared in particular when heating with a gas flame, does not occur here. For example, the tooth thickness from the tooth base to the tooth tip may decrease by more than one third, for example from 0.6 to 0.37 mm.

Furthermore, an all steel card clothing can be produced with the method according to the invention, in that the teeth—starting from the tooth gullet—continue to extend in a straight manner up to the tooth tip. This is true, in particular because a subsequent grinding is not necessary due to the inventive induction hardening.

BRIEF DESCRIPTION OF THE DRAWINGS

Additional details of advantageous parts of the invention can be inferred from the claims, the description and the drawings. They show in FIG. 1 a schematized block diagram of the process of the inventive induction hardening of a wire of an all-steel card clothing;

FIG. 2 a schematized perspective representation of the wire for the production of an all-steel card clothing;

FIG. 3 a cross-sectional view of the wire according to FIG. 2;

FIG. 4 a lateral view of a detail of the wire according to FIG. 3;

FIG. 5 the progression of hardness of a tooth of the wire according to FIGS. 3 to 4; and FIG. 6 a cross-sectional representation of a detail of the wire similar to FIG. 3, illustrating the zone of hardness transition.

DETAILED DESCRIPTION

FIG. 1 shows a device 10 for the production of a wire 11 as is required for the assembly of an all-steel card clothing of a clothing roll. The device 10 is disposed for the production of this wire 11 of a profile wire 12 that is moved in its longitudinal direction L through the stations of the device 10.

Among other things, the device 10 comprises a punching station 13 that is disposed to apply recesses 14 to the profile wire 12 (FIG. 2) and thus form teeth 15. Upstream of the punching station 13 it is possible to provide one or more alignment stations or other stations. Additionally or supplementarily, a grinding station or the like may be arranged downstream of the punching station. Additional stations, for example, for aligning the profile wire 12 or the wire 11, may be provided as needed upstream or downstream of the punching station 13 as needed; however, they are not shown.

A heating station, e.g., in the form of a first conductor that is disposed for the inductive heating of the wire 11, is arranged downstream of the punching station 13. In so doing, the first inductor 16 generates a field that covers at least the base section 17 of the wire, however—optionally—also its teeth 15. The first inductor 16 operates at the first frequency f1 between 100 kHz and 5 MHz, preferably between 500 kHz and 2 MHz, in the present exemplary embodiment at 1 MHz. In so doing, the wire 11 is preferably heated to a first temperature t1 of preferably higher than 300° C. in the region of the base section 17 of said wire. In the present exemplary embodiment the temperature t1 is 700° C. to 750° C. Preferably it is set in such a manner that there will be no hardening of the base region 17 during subsequent quenching.

At some distance (e.g., a few decimeters) from the first inductor 16, there is provided a second inductor 18 that operates at a clearly higher frequency f2. It is at least 5, preferably at least 10 and most preferably at least 20 times higher than the first frequency f1. For example, the second frequency f2 is 20 MHz to 30 MHz, preferably 27 MHz. In doing so, the second inductor 18, is preferably configured in such a manner that it covers only the teeth 15 or a section of each tooth 15. There is no active cooling between the inductors 16 and 18. Rather, the wire 11 passes the distance in less than 2 seconds, preferably less than 1 second.

FIG. 4 shows a tooth 15 having a tooth height H15 that extends perpendicular to the longitudinal direction from the tooth gullet 21 to the tooth tip 20. Furthermore a section 19 of the tooth 15 is defined, said section extending from the tooth tip 20 to approximately its center or slightly further in the direction of the tooth gullet 21. The section 19 has a height H19 that preferably amounts to more than 70%, better more than 80% of the tooth height H15. In any event, however, the second inductor 18 covers at least the section 19 of each tooth 15 or also a slightly greater region. Preferably, however, the second inductor 18 does not cover the tooth gullet 21. The second inductor 18 and, if desired, also the first inductor 16, may work in an inert gas atmosphere, e.g., of nitrogen. This gas atmosphere may be moved up to a quenching station 22.

After passing through the inductors 16 and 18, the hot wire 11 reaches the quenching station 22. In doing so, the base section 17 has a temperature t1 below the austenitizing temperature range tA, whereas the section 19 of each tooth 15 has a temperature t2 within the austenitizing temperature range tA. The temperature gradient from the section 19 to the base section 17 has the effect that the wire 11—while it is moving into the quenching station 22—hardens uniformly in particular in the section 19 but that the rest of the wire 11 remains unhardened.

As is obvious from FIG. 3 the base section 17 has a thickness D17 to be measured transversely to the longitudinal direction and perpendicularly to the lateral surface, said thickness being greater than the thickness D15 to be measured on each tooth 15. The thermal energy storage capacity of the base D17 is greater than the thermal energy storage capacity of each tooth 15. However, too great a heat flow from the tooth 15 to the base section 17 before the quenching station 22 is reached is avoided due to raising the temperature of the base section 17 to the first temperature t1.

The wall section 23 extends away from the base section 17 that, typically, has a rectangular cross-section, in which case the wall section may have a triangular or, as shown, a trapezoidal cross-section. Upon passing through the second inductor 18, a temperature transition zone 24 is provided on the wire 11, in which zone the temperature drops from the second high temperature t2 (for example, 950° C.) to the first low temperature t1 (e.g., 5501 ° C.) that is to be measured below the temperature transition zone 24 on the remaining section of the wall 23 and the base section 17. Accordingly, during the quenching process after passing through the quenching station 22, the hardness progression as depicted in FIG. 5 occurs in the wire 11. A uniform hardness of greater than 800 HV 0.5 is achieved in section 19. The temperature transition zone 24 became a transition zone 24 of the hardness transition, wherein the hardness of greater than 800 HV 0.5 drops to approximately 200 HV 0.5 or lower. This zone exhibits a vertical hardness expansion H24, measured away from the base section 17, and, preferably, amounts to only 20% of the tooth height H15. The temperature transition zone 24 forms a straight strip extending in longitudinal direction L and having a width that corresponds to the height H24. This strip may be arranged at a distance A from the tooth gullet 24. However, it is also possible and advantageous to reduce the distance A to zero, so that the base-section-side boundary of the zone 24 is in contact with the tooth gullet 21. Furthermore, it is possible to lay the transition zone 24 even deeper, so that the tooth gullet 21 is located in the region of the hardness transition of the transition zone 24.

FIG. 6 shows the transition zone 24 in cross-section. The boundaries of the transition zone 24—as indicated by lines 25, 26, may extend straight through the wall section 23 or the respective tooth 15 in transverse direction. However, it is also (preferably) possible for the transition zone 24 to be delimited along curved lines 27, 28 by the hardened or unhardened region. The lines 25 and/or 26 may be oriented parallel to the gullet surface 17a of the base section 17. Accordingly, each of the lines 27 and/or 28 on both sides of the tooth 15 end at the same height. Preferably, the lines 27, 28 follow arcs that are curved toward the gullet surface 17a. Preferably, the center of curvature is located on the side of each line 27, 28 remote from the base section 17—preferably, again within the cross-section of the tooth 15. The boundaries of the transition zone 24 are visible in the cross-sectional view of the all-steel card clothing. However, due the corresponding setting of the temperature t1 of the base section 17 and the setting of the dwell time of the wire 11 on its path between the first inductor 16 (or another heating station) and the second inductor, the thermal load (source or sink) of the base section 17 can be adjusted in such a manner that the lines 25 and/or 26 extend obliquely with respect to the gullet surface 17a. It then applies to the lines 27 and/or 28 that they end on both sides of the tooth 15 at different heights.

In the method according to the invention, a wire 11 provided with teeth 15 passes sequentially through a first inductor 16 and a second inductor 18. The inductors 16, 18 operate at different frequencies f1, f2 and generate different temperatures t1, t2. The first inductor 16 heats in particular the base sections 17, which are not to be hardened, to a high temperature t1 below the austenitizing temperature range tA. The second inductor 18 heats the teeth 15 to a still higher second temperature t2 within the austenitizing temperature range tA. Defined, hardened teeth of consistently high quality result at quenching.

In order to improve the properties of the wire 11, in particular for reducing tensions, the wire may pass through a third inductor 29. The latter operates at a third frequency f3 that may be between 500 kHz and 5 MHz and is preferably between 1 MHz and 2 MHz. The frequency f3 may correspond to the first frequency f1. The temperature t3 generated by the third inductor 29 is an annealing temperature of, e.g., a few hundred degrees Celsius.

Furthermore, the wire 11 may be moved through a burr-removal station—before or after annealing. In this station, punching burrs that have potentially formed when the recesses 14 were punched can be removed, e.g., by brushes, that act only on one flat side of the teeth 15.

In the method according to the invention, a wire 11 provided with teeth 15 passes sequentially through a first inductor 16 and a second inductor 18. The inductors 16, 18 function at different frequencies and generate different temperatures. The first inductor 16 heats in particular the base section 17, which is not to be hardened, to a high temperature below the austenitizing temperature range. The second inductor 18 heats the teeth 15 to a still higher second temperature within the austenitizing temperature range. Defined, hardened teeth of consistently high quality result at quenching.

LIST OF REFERENCE SIGNS

10 Device
11 Wire
12 Profile wire
13 Punching station
14 Recesses
15 Teeth
H15 Tooth height
16 First inductor or other heat source
17 Base section
t1 First temperature
f1 First frequency
18 Second inductor
t2 Second temperature
f2 Second frequency
19 Section of the tooth 15
20 Tip of the tooth 15
21 Gullet of the tooth
H19 Height of section 19
22 Quenching station
tA Austenitizing temperature range
D17 Thickness of the base section 17
D15 Thickness of the tooth 15
23 Wall section
24 Temperature transition zone
H24 Height of the zone
A Distance
25, 26, 27, 28 Lines
f3 Third frequency
t3 Third temperature
29 Third inductor/other heat source
30 Tooth back

The invention claimed is:

1. Method for the production of an all-steel card clothing for carding machines, wherein the method comprises:
   providing a wire (11) having a base section (17) and a wall section (23) that extends away from the base section (17) and has a lower thickness (DIS) than said base section (17),
   applying recesses (14) in the wall section (23) of raw material wire (12) in order to form teeth (15),
   in feed-through mode, heating at least the base section (17) of the wire (11) to a first temperature (t1) by at least one first inductor (16) at a first frequency (f1),
   in feed-through mode, at least sectionwise induction heating the wall section (23) of the wire (11), said wire (11) having been preheated at least on the base section (17), by at least one second inductor (18) operates at a second frequency (f2) to a second temperature (t2),
   wherein the second frequency (f2) that is higher than the first frequency (f1), wherein the second temperature (t2) is higher than the first temperature (t1),
in feed-through mode, quenching at least the wall section (23) of the wire (11) with a cooling medium.

2. Method according to claim 1, further comprising producing the recesses (14) in feed-through mode by a punching process.

3. Method according to claim 1, wherein the first temperature (f1) is below an austenitizing temperature range (tA) and the second temperature is within the austenitizing temperature range (tA).

4. Method according to claim 1, wherein the second frequency (f2) is at least five times that of the first frequency (f1).

5. Method according to claim 1, wherein the first frequency (f1) is at most 5 MHz and the second frequency is at least 10 MHz.

6. Method according to claim 1, further comprising, after quenching, passing the wire (11) through a third inductor (29) that is operated at a third frequency (f3) that is lower than the second frequency (f2) in order to heat the wire (11) to a third temperature that is at least lower than the second temperature (t2).

7. Method according to claim 1, wherein at least the induction heating at the second frequency (f2) to the second temperature (t2) takes place under protective gas.

8. Method according to claim 1, further comprising brushing the wire (11) at least on one lateral surface.

9. All-steel card clothing comprising a wire (11) defining a longitudinal direction (L), said wire having a base section (17) and a wall section (23) with teeth (15) having a tooth height (H15), said wall section having at least one section (19) having increased hardness and extending away from the base section (17),
wherein the base section (17) has a greater thickness (D17) than the wall section (23), and
the wall section (23) has a boundary following a straight line defining a transition zone (24) extending parallel to the longitudinal direction (L), in which transition zone (24) the at least one section (19) having the increased hardness begins;
wherein the wall section (23) has teeth (15) between which one tooth gullet (21), respectively, is formed, and that the transition zone (24) extends below said tooth gullet (21), wherein the transition zone (24) is formed at least partially within the teeth;
wherein the transition zone (24) has a width in a direction of the tooth height of at most 0.5 mm.

10. All-steel card clothing according to claim 9, wherein each tooth (15) has a tooth tip (20) and a distance of the transition zone (24) from the tooth tip (20) is at least 70% of the tooth height (H15).

11. All-steel card clothing according to claim 9, wherein the wall section (23) has a cross-section that is configured trapezoidally or triangularly tapering away from the base section (17).

12. All-steel card clothing according to claim 9, wherein each tooth (15) has a tooth tip (20) and a straight tooth back (30), said tooth back extending up to the tooth tip (20).

13. All-steel card clothing according to claim 9, wherein the all-steel card clothing is largely metallic bright and free of scales, respectively, in which case said card clothing is free of traces of a chemical burr removal or subsequent processing, as well as free of traces of any mechanical finishing.

14. All-steel card clothing according to claim 9, wherein the transition zone (24) has a width in a direction of the tooth height of at most 20% of the tooth height.

15. All-steel card clothing comprising a wire (11) defining a longitudinal direction (L), said wire having a base section (17) and a wall section (23) with teeth (15) having a tooth height (H15), said wall section having at least one section (19) having increased hardness and extending away from the base section (17),
wherein the base section (17) has a greater thickness (D17) than the wall section (23), and
the wall section (23) has a boundary following a straight line defining a transition zone (24) extending parallel to the longitudinal direction (L), in which transition zone (24) the at least one section (19) having the increased hardness begins;
wherein the wall section (23) has teeth (15) between which one tooth gullet (21), respectively, is formed, and that the transition zone (24) extends below said tooth gullet (21), wherein the transition zone (24) is formed at least partially within the teeth;
wherein the transition zone (24) has a width in a direction of the tooth height of at most 20% of the tooth height.

16. All-steel card clothing comprising a wire (11) defining a longitudinal direction (L), said wire having a base section (17) and a wall section (23) with teeth (15) having a tooth height (H15), said wall section having at least one section (19) having increased hardness and extending away from the base section (17),
wherein the base section (17) has a greater thickness (D17) than the wall section (23), and
the wall section (23) has a boundary following a straight line defining a transition zone (24) extending parallel to the longitudinal direction (L), in which transition zone (24) the at least one section (19) having the increased hardness begins;
wherein the wall section (23) has teeth (15) between which one tooth gullet (21), respectively, is formed, and that the transition zone (24) extends below said tooth gullet (21), wherein the transition zone (24) is formed at least partially within the teeth and is delimited along curved lines in a direction transverse to the longitudinal direction.

* * * * *